(12) United States Patent
Dennis

(10) Patent No.: US 9,936,297 B2
(45) Date of Patent: *Apr. 3, 2018

(54) HEADPHONE AUDIO AND AMBIENT SOUND MIXER

(71) Applicant: TV Ears, Inc., Spring Valley, CA (US)

(72) Inventor: George Joseph Dennis, Scottsdate, AZ (US)

(73) Assignee: TV Ears, Inc., Spring Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,994

(22) Filed: Nov. 15, 2016

(65) Prior Publication Data

US 2017/0142511 A1   May 18, 2017

Related U.S. Application Data

(60) Provisional application No. 62/255,996, filed on Nov. 16, 2015.

(51) Int. Cl.
*H04R 1/10* (2006.01)
*H04R 5/04* (2006.01)
*G06F 3/16* (2006.01)
*H04R 5/033* (2006.01)

(52) U.S. Cl.
CPC ............. *H04R 5/04* (2013.01); *G06F 3/165* (2013.01); *H04R 1/1041* (2013.01); *H04R 1/1083* (2013.01); *H04R 5/033* (2013.01); *H04R 2420/07* (2013.01); *H04R 2430/01* (2013.01)

(58) Field of Classification Search
CPC ............ G06F 3/165; H04R 5/033; H04R 5/04
See application file for complete search history.

(56) References Cited

U.S. PATENT DOCUMENTS

| 2001/0046304 | A1* | 11/2001 | Rast | H04R 1/1041 381/74 |
| 2008/0181435 | A1* | 7/2008 | Ozaki | H03G 3/348 381/107 |
| 2009/0252355 | A1* | 10/2009 | Mao | H04R 1/1083 381/309 |
| 2010/0020978 | A1* | 1/2010 | Garudadri | H04R 5/04 381/57 |

(Continued)

OTHER PUBLICATIONS

Solon, O., "Amazon plans headphones that know when someone says your name", The Guardian, https://www.theguardian.com/technology/2016/aug/01/amazon-noise-cancelling-headphones-know-your-name, Aug. 1, 2016, 2 pgs.

*Primary Examiner* — Joseph Saunders, Jr.
(74) *Attorney, Agent, or Firm* — Knobbe, Martens, Olson & Bear, LLP

(57) ABSTRACT

A headphone set can enable the substantially simultaneous output of two or more audio sources to a user. The audio from the multiple sources may be mixed so that a listener can hear and understand audio received from multiple audio sources. Thus, in certain embodiments, a user can consume media and also engage in conversation with other users or listen to ambient sounds, such as a telephone ringing or an alarm. Further, a mobile device, such as a mobile phone, can mix audio from multiple sources enabling a user to consume audio from the device while also listening to ambient sound or audio received from a source other than the device, using currently-available headphones.

18 Claims, 9 Drawing Sheets

(56) References Cited

U.S. PATENT DOCUMENTS

| 2010/0202621 A1* | 8/2010 | Murata | H03G 3/32 |
| | | | 381/26 |
| 2015/0063586 A1* | 3/2015 | Shah | H04R 1/1041 |
| | | | 381/74 |
| 2015/0280669 A1* | 10/2015 | Vilermo | H04R 1/1041 |
| | | | 381/107 |
| 2015/0358767 A1 | 12/2015 | Luna et al. | |

* cited by examiner

HEADPHONE AUDIO AND AMBIENT SOUND MIXER

PRIORITY APPLICATIONS AND INCORPORATION BY REFERENCE

This application claims the benefit of U.S. Provisional Patent Application No. 62/255,996, filed Nov. 16, 2015, and entitled "HEADPHONE AUDIO AND AMBIENT SOUND MIXER," which is hereby incorporated by reference in its entirety for all purposes. Further, this application incorporates by reference in its entirety U.S. application Ser. No. 13/839,751, filed on Mar. 15, 2013 and titled "SYSTEM FOR STREAMING AUDIO TO A MOBILE DEVICE USING VOICE OVER INTERNET PROTOCOL." Any and all applications, if any, for which a foreign or domestic priority claim is identified in the Application Data Sheet of the present application are hereby incorporated by reference in their entireties under 37 CFR 1.57.

BACKGROUND

Many users are capable of multitasking when consuming media. For example, a user may be able to listen to the radio or watch television while also having a conversation with another user. However, some users like to wear headphones when consuming media. When wearing headphones, it can be more difficult to multitask because the headphones may block or reduce the ability to hear external or ambient sounds.

SUMMARY OF DISCLOSURE

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain embodiments disclosed herein relate to a headphone set. This headphone set may include a left speaker housing comprising a left speaker and a right speaker housing comprising a right speaker. Further, the headphone set may include a connecting band connecting the left speaker housing with the right speaker housing. In addition, the headphone set may include electronic audio mixing circuitry disposed in one or more of the left speaker housing, the right speaker housing, or the connecting band. The electronic audio mixing circuitry may include an audio input configured to receive a first audio signal from an audio device over a wired or wireless connection. Further, the electronic audio mixing circuitry may include a microphone configured to receive ambient audio from a user environment external to the headphone set and to convert the audio into a second audio signal. Moreover, the electronic audio mixing circuitry may include a first volume control disposed in one of the left speaker housing and the right speaker housing. The first volume control may be movable by a user to adjust a first volume level associated with the first audio signal to produce an adjusted first audio signal. In addition, the electronic audio mixing circuitry may include a second volume control disposed in one of the left speaker housing and the right speaker housing. The second volume control may be movable by the user to adjust a second volume level associated with the second audio signal to produce an adjusted second audio signal. Further, the electronic audio mixing circuitry may include an audio mixer configured to mix the adjusted first audio signal with the adjusted second audio signal to obtain an audio output and to supply the audio output to one or both of the left speaker and the right speaker.

In certain embodiments, the audio mixer comprises a hardware audio mixer. Further, one or more of the left speaker or the right speaker may be configured to output the audio output. In some implementations, one of the left speaker or the right speaker is configured to output a first component of the audio output corresponding to the first audio signal and the other of the left speaker or the right speaker is configured to output a second component of the audio corresponding to the second audio signal.

In some embodiments, the headphone set may include a wireless receiver. The wireless receiver may be configured to receive a volume control signal for adjusting an audio volume and provide the volume control signal to the first volume control, the second volume control, or both the first volume control and the second volume control. In some cases, the electronic audio mixing circuitry further comprises an amplifier configured to amplify one or more of the first audio signal or the second audio signal. Further, in some cases, the first audio signal and the second audio signal are mixed using superposition. In certain implementations, the audio input device comprises a wireless receiver.

Certain embodiments disclosed herein relate to a speaker apparatus. The speaker apparatus may include an audio input configured to receive a first audio signal from an audio device. Further, the speaker apparatus may include a microphone configured to receive audio from a user environment and to convert the audio into a second audio signal. In addition, the speaker apparatus may include a first volume control configured to adjust a first volume level associated with the first audio signal. The speaker apparatus may also include a second volume control configured to adjust a second volume level control associated with the second audio signal. Further, the speaker apparatus may include an audio mixer configured to mix the first audio signal with the second audio signal based at least in part on the first volume level and the second volume level to obtain an audio output. In addition, the speaker apparatus may include headphone speakers configured to output the audio output.

In some implementations, the audio mixer comprises a hardware audio mixer. Further, the headphone speakers may further comprise a first speaker configured to output a first component of the audio output and a second speaker configured to output a second component of the audio output. In addition, the speaker apparatus may include a wireless receiver configured to receive an input to the first volume control from an external volume control source. The first volume control may adjust the first volume level based at least in part on the input to the first volume control. The speaker apparatus may further include a wireless receiver configured to receive an input to the second volume control from an external volume control source. The second volume control may adjust the second volume level based at least in part on the input to the first volume control.

In some embodiments, the speaker apparatus further comprises an amplifier configured to amplify one or more of the first audio signal or the second audio signal. Further, the first audio signal and the second audio signal may be mixed using superposition. In some cases, the audio input device comprises a wireless receiver.

Certain embodiments disclosed herein relate to a method of combining audio from a plurality of audio sources. The method may be performed by a hardware audio mixer comprising one or more hardware processors. The method may include receiving a first audio signal from a media device configured to output audio and receiving, at a microphone, ambient audio from an environment that includes the media device. Further, the method may include converting the ambient audio to a second audio signal. In addition, the method may include receiving a first volume level associated with the first audio signal and receiving a second volume level associated with the ambient audio. Moreover, the method may include mixing the first audio signal and the second audio signal based at least in part on the first volume level and the second volume level to obtain an audio output signal.

In some embodiments, the method may include mixing the first audio signal and the second audio signal using superposition. The method may further include outputting the audio output signal via one or more speakers included in a set of headphones. In some cases, the media device includes the hardware audio mixer.

Although certain embodiments and examples are disclosed herein, inventive subject matter extends beyond the examples in the specifically disclosed embodiments to other alternative embodiments and/or uses, and to modifications and equivalents thereof.

DETAILED DESCRIPTION

Figure 1:
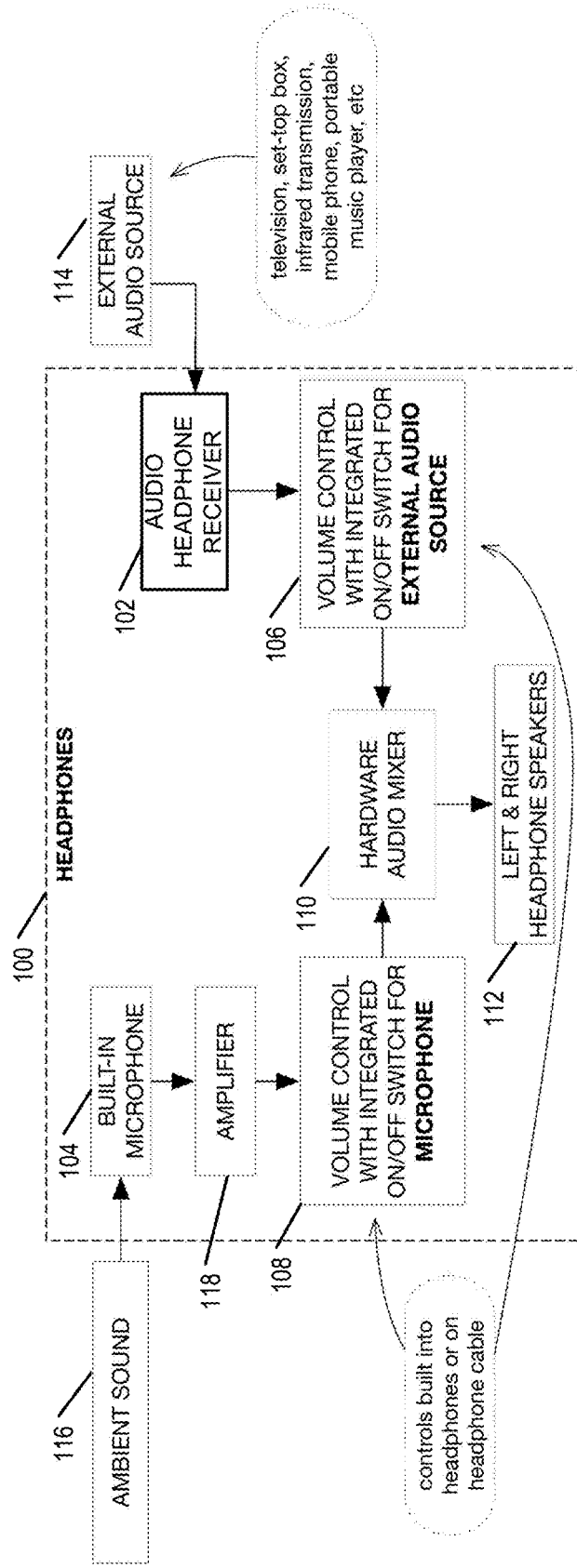
FIG. 1 illustrates a block diagram of an embodiment of a multiple audio source headphone set.

As previously described, some users may consume media via headphones. However, when wearing headphones, a user may be unable to hear other media or ambient sounds. Further, some users, such as older users or users who are born with a hearing impediment, have difficulty hearing and therefore, have trouble listening to a radio or watching television. These users may compensate for their hearing problems by raising the volume above the level that an average user without hearing problems may set the volume because the users with hearing problems may have trouble hearing media that is played at a volume that an average user without hearing trouble finds comfortable. However, if the volume is increased, users who do not have hearing problems may be uncomfortable or may even develop hearing problems from the loud audio. Further, people who are not watching the television or consuming the media may not appreciate the audio volume set by a user who has difficulty hearing.

Some users who have difficulty hearing may use headphones so that they can increase the volume of the media being consumed without disturbing other users. However, often the headphones may interfere with a user's ability to hear ambient sounds. Thus, a user wearing headphones to listen to media may have trouble having a conversation with other users in the room or hearing other sounds, such as doorbells, alarms, or the telephone ringing.

Moreover, when wearing some types of audio, television, gaming, noise cancelling or functional headphones, naturally occurring ambient sounds are blocked isolating the user from his or her environment. This compromised listening situation creates a safety hazard and hinders communication with others.

Certain embodiments disclosed herein add a manually adjustable microphone and an automatic mixing circuit to a headphone so the user can hear naturally occurring ambient sounds in his or her environment while using the headphone. Further, some embodiments disclosed herein enable the user to hear a media system (e.g., a television) while enabling the user to communicate with other users and hear other people and/or sounds within a particular environment.

With many conventional headphones, a user could not hear naturally occurring ambient sounds in his or her environment while using a pair of headphones. Embodiments of the present disclosure give the user the ability to mix into the headphone audio stream a desired amount of ambient sounds, thereby making it easier to communicate, stay informed, and avoid accidents.

Some solutions to the above described compromised listening situation involve using headphones with a mute button to stop the audio received over the headphones. However, mute buttons do not amplify ambient noise, which may still be blocked by the wearing of the headphones. Removing the headphones may solve the problem of not hearing ambient sounds, but will interrupt the user experience of listening to a television, radio, or other media system.

Another solution is to use a mute button with a volume adjustable microphone. However, as with the previously described mute button, the mute button with the volume adjustable microphone stops the audio of the headset. Thus, the user experience with relation to the media system is interrupted. This can be particularly problematic when the media system (e.g., the television) continues to play the media for other users in the room thereby causing the user with the headset to choose between hearing the television or hearing ambient sound (e.g., the conversation in the room).

An alternative solution is to use single ear headphones. However, the use of single ear headphones generally prevents the delivery of stereo sound. Further, receiving audio in one ear may compromise comprehension of the audio. Moreover, single ear headphones may not enable users who have difficulty hearing in one ear from listening to both the media system and ambient sound.

Another solution is to use a mobile application ("app") (e.g., for phones, tablets, or other computing devices) based product that can automatically reduce or mute the audio of a smart device when ambient sound is detected. However, this solution is generally limited to app based products and does not give the user the ability to mix in a desired amount of ambient sound while listening to the headphone audio.

Other solutions interrupt the user experience, mute the audio stream, amplify ambient noise only when the headset is muted or require a mobile app and therefore, few people use them.

Embodiments disclosed herein allow a headphone user to enjoy his or her audio as usual while at the same time adjusting how loudly he or she wants to hear ambient sounds in his or her immediate environment or within a particular range of the user. These headphones enable a user to multitask by allowing the user to listen to multiple audio sources. Further, embodiments disclosed herein improve the ability of headphone users to communicate with others and will keep the headphone users safer and better informed because the users can hear sounds (e.g., conversations, fire alarms, telephone rings, extravehicular sounds, etc.) from the ambient environment while hearing the audio of the media system.

Example Multi-Source Headphones

As illustrated in FIG. 1, certain embodiments disclosed herein can include a pair of headphones 100 that include an audio headphone receiver 102, a microphone 104, on/off volume controls 106 and 108, a mixing circuit 110, and one or more headphone speakers 112. The audio can be received from an external source 114 (e.g., a television, a game system, a karaoke machine, a radio, an audio/visual receiver, or other audio device) as an input to the receiver 102 and from an ambient source 116 (e.g., conversations from other users in the room) via the microphone 104. Both sources of audio can be mixed together using the hardware audio mixer 110, allowing the user to customize the user's listening experience. In some cases, the hardware audio mixer 110 may include software that facilitates the process of mixing the audio from the external source and the external microphones. Further, in some implementations, the hardware audio mixer 110 is replaced by or used in conjunction with a software-based audio mixer.

The audio receiver 102 may include any type of receiver that can receive audio. The audio receiver 102 may be connected via a wire to the audio source 114. Alternatively, the audio receiver 102 may receive audio wirelessly. For example, the audio receiver 102 may be a Bluetooth® receiver or may implement any other type of wireless protocol. Further, the audio receiver 102 may include a receiver assembly for receiving audio input. This receiver assembly may include a headphone plug, an amplifier, one or more filters, or a controller implemented in computer hardware that can control the processing of received audio signals and the provisioning of the received audio signals to the hardware audio mixer 110. Further, the receiver assembly may receive hardware for wirelessly receiving an audio signal, such as an antenna, an amplifier, or one or more filters. Further, in some cases, the audio receiver 102 and/or the microphone 104 may include signal converters or generators that are configured to convert received audio into an audio signal that may be further processed by the headphones 100.

Although the audio source 114 is described as an external audio source, it should be understood that in many listening scenarios both the audio source 114 and the audio source 116 are external to the headphones 100. However, in some listening scenarios, the audio source 114 may be internal to the headphones 100. For example, the audio source 114 may be a memory or storage device that is included in the headphones 100. In one embodiment, the audio source 114 connects to the headphones 100 via a wire. However, in other embodiments, the audio source 114 communicates wirelessly with the headphones 100. Further, the audio source 114 may be a media device to which a user has selected to listen while the source 116 may be some ambient source of sound that is not necessarily intended for consumption via the headphones 100, but which may be received via the microphone 104. For example, the audio source 114 may be a television, a radio, a telephone or smartphone, or a computing device, while the audio source 116 may be any ambient sound in the environment and which si detectable by the microphone 104. Some examples of these ambient sounds include the speech of a nearby person within range of the microphone 104, an alarm, a doorbell, and a ringing telephone.

In some embodiments, the audio sources 114 and 116 are not limited in type and may, in some cases, be the same type of audio. For example, the audio source 114 and 116 may both be televisions. In this example, a user may be at a sports bar and attempting to watch two sports events (e.g., two different football games) being played on two different televisions. In many cases, a "primary television," as selected by the sports bar may have the volume at a high enough level to be heard by its customers while the other "secondary televisions" may be muted. In some such cases, the headphones 100 may receive the audio from the primary television as the ambient sound 116 via the microphone 104 and receive audio from one of the secondary televisions as the external audio source 114 via a wire or wirelessly. Alternatively, in some cases, the headphones 100 may be configured with multiple receivers 102 that enable the headphones 100 to receive audio signals by a wire or wirelessly from multiple sources. In some such cases, the headphones 100 may receive audio from multiple televisions, enabling the user to listen to multiple sporting events, or other programs, while watching multiple televisions. Similarly, the headphones 100 may be used to receive audio from a television and from a radio or other media source.

Advantageously, in certain embodiments, the headphones 100 mixes the ambient sounds 116 with the external audio 114 to enable a listener to hear multiple audio sources simultaneously. One or more controls on the headphones 100 can allow the listener to adjust the level of mixing to increase the volume of one audio source over another. For example, the listener may turn down a television audio source and/or turn up the ambient audio source to be able to momentarily hear a family member speak to him.

In certain embodiments, the headphones 100 of FIG. 1 can include two separate volume controls 106, 108, which may each be integrated into the headphones or into a headphone cable that connects the headphones to an audio source. One of the volume controls 106 may be used to turn on or off, or adjust the volume of the external audio source (e.g., the television audio input). The second volume control 108 may be in electrical communication with a microphone/receiver circuit that when turned on captures the ambient sound of the immediate environment, or within a particular wireless range of the headphones 100, and mixes the captured ambient sound with the audio stream received from the external source of the headphone via the mixing circuit 110. In some embodiments, the volume controls 106 and 108 may include separate physical controls (e.g., dials) for separately adjusting the volume of the respective audio sources 114, 116 that is output via the headphone speakers 112. Alternatively, the volume controls 106 and 108 may represent separate volume control circuits that may be controlled via a single physical control (e.g., dial). In some such cases, the particular volume control circuit may be selected via a user interface control, such as a button (e.g., on a smartphone app in wireless communication with the headphones). Further, in some cases, the volume controls 106 and 108 may be combined into a single volume control system that can separately adjust the audio for each audio source 114, 116 that is output via the speakers 112.

The mixing circuit 110 can use a variety of algorithms for mixing the audio of the ambient sound 116 and the audio of the external audio source 114. For example, the mixing circuit may combine (e.g., add) sample values associated with the audio sounds, either using hardware or software adders. For example, the audio signal corresponding to the received ambient sound 116 and the received signal from the audio source 114 may be combined using the following formula:

$$a*x+b*y \qquad (1)$$

where x and y may represent the audio signal corresponding to the received ambient sound 116 and the received signal from the audio source 114, respectively, and a and b represent weights that may be applied to the signals based on the volume control settings for each of the audio sources.

In some cases, the headphones 100 may include a single volume control that reflects the proportion of the output that is based on the ambient sound 116 versus the audio source 114. In this case, there may be a single weight that functions as a ratio of the proportion of the signal output that corresponds to the ambient sound 116 and the proportion of the signal output that corresponds to the audio source 114.

In some cases, the headphones 100 may mix any number of audio sources. Thus, formula 1 may be rewritten as follows:

$$a*x+\Sigma_{n=1}^{\infty} b_n * y_n \qquad (2)$$

where a may represent the volume control, or weight, for an audio source x and $b_n$ represents the volume control, or weights, for some number of audio sources $y_n$.

Adjustable gains, whose values depend on the respective volume controls, can adjust how much of each signal is combined in the mixing circuit. In some embodiments, the mixing circuit may also include one or more circuits for reducing or eliminating distortion in the output audio. For example, the mixing circuit may include an echo cancellation circuit to reduce an echo caused by the microphone picking up audio from the media system or external audio source. Further, the hardware audio mixer may include circuitry for filtering audio received by the microphone from the media system or external audio source.

In some cases, the headphones 100 may include an amplifier 118 that can amplify the signal received from the microphone. In some cases, this amplifier 118 may be included as part of the audio mixer 110. Although the amplifier 118 described as a single amplifier, it should be understood that the headphones 100 may include multiple amplifiers. For example, the headphones 100 may include an amplifier for each audio source input (e.g., the microphone 104 and the receiver 102). As another example, the headphones 100 may include different amplifiers for processing different signal frequencies or multiple amplifiers to facilitate adjustment of the signal to satisfy different volume settings. In some cases, the amplifier 118 may be omitted and/or replaced with one or more potentiometers in communication with the one or more volume controls 106, 108.

Further, although not illustrated, the headphones 100 may include one or more analog to digital converters (ADCs) and/or one or more digital to analog converters (DACs). In certain embodiments, the hardware audio mixer 110 may be or may include one or more general purpose processors and/or digital signal processors that receives a digitally converted signal corresponding to the audio received from the audio source 114 and a digitally converted signal corresponding to the audio source 116. The signals may be combined using one or more signal combination or superposition techniques. For example, the hardware audio mixer 110 may implement one or more of the functions defined above as equations 1 or 2. The output of the hardware audio mixer 110 may be provided to a DAC that converts the digital signal to an analog signal for output by the speakers 112.

The output of the hardware audio mixer 110 may be supplied to the left and right headphone speakers 112. Alternatively, in some embodiments, output corresponding to the audio source 114 may be provided to one headphone speaker and output corresponding to the audio source 116 may be provided to the other headphone speaker. In some implementations, a user can control which speaker outputs sound corresponding to each audio source 114, 116 and/or whether both speakers output both audio sources. The user can select both which audio is output, including a mix of multiple audio sources, and which speaker outputs the audio using volume control switches that interact with the volume control circuits 106 and 108. The volume control switches can activate or deactivate processing of one or more of the audio sources, thereby controlling whether a particular audio source is output to a user. Further, the volume control switches can control the volume of each of the audio sources that is output to the user. Thus, for example, the circuit 106 can control whether the external audio source 114 is output to the user and the volume of the audio that is output based on the audio source 114. Similarly, the circuit 108 can control whether the ambient sound source 116 is output to the user and the volume of the audio that is output based on the audio source 116. Moreover, if both audio sources are selected for output, the volume control circuits 106 and 108 can control the mixture level of the audio sources when mixing the audio for output to the user.

As previously described, in some cases, a single weight may be used to control how much of one audio source is included in the output audio versus the other audio source. In such cases, one of the volume control circuits 106 or 108 may be omitted. Alternatively, a single volume control button or interface may be used to control both the volume control circuits 106 and 108. In cases where a single user interface device (e.g., a dial) is used to control the mixture of the audio signals, setting the interface device to one end of the scale (e.g., turning the dial to maximum in one direction) may result in output of only one audio source. Similarly, setting the interface device to the opposite end of the scale (e.g., turning the dial to maximum in the opposite direction) may result in output of only the other audio source. Setting the interface device to somewhere between either ends of the scale (e.g., turning the dial to some point between the two maximums, or the maximum and the minimum) may result in output of a mixture of the audio sources.

Advantageously, in certain embodiments, the headphones 100 enable users who may have difficulty hearing to use an aid to help hear an audio source while still being able to hear ambient sounds. For example, the headphones 100 enable a user to listen to a television while still being able to hear conversations within the user's location (e.g., a room with the television).

Although the headphones 100 described herein work with two audio sources, one from the external audio source 114 (e.g., television) and one from an ambient source 116 (e.g., conversations in the room picked up by a microphone 104), the disclosure is not limited as such. In some embodiments, the headphones 100 may be capable of picking up more than two audio sources and may mix the audio sources based on a volume control associated with each audio source. For example, the headphones 100 can mix three audio sources, including ambient sound from the environment, a music track, and dialog audio from a video (such as a college lecture). In some cases, separate settings or controls may be used to regulate the mixture of the audio sources and the volume of the audio sources. Thus, in some cases, the rate of mixture of the audio sources may be independently controlled from the volume of the output of each of the audio sources.

Further, although FIG. 1 is described with respect to a headphone set, the disclosure is not limited as such. For example, embodiments herein can be implemented within a wireless device, such as a smartphone, tablet, laptop, or other computing device (see, e.g., FIGS. 3-4).

Example Headphones

Figure 2A:
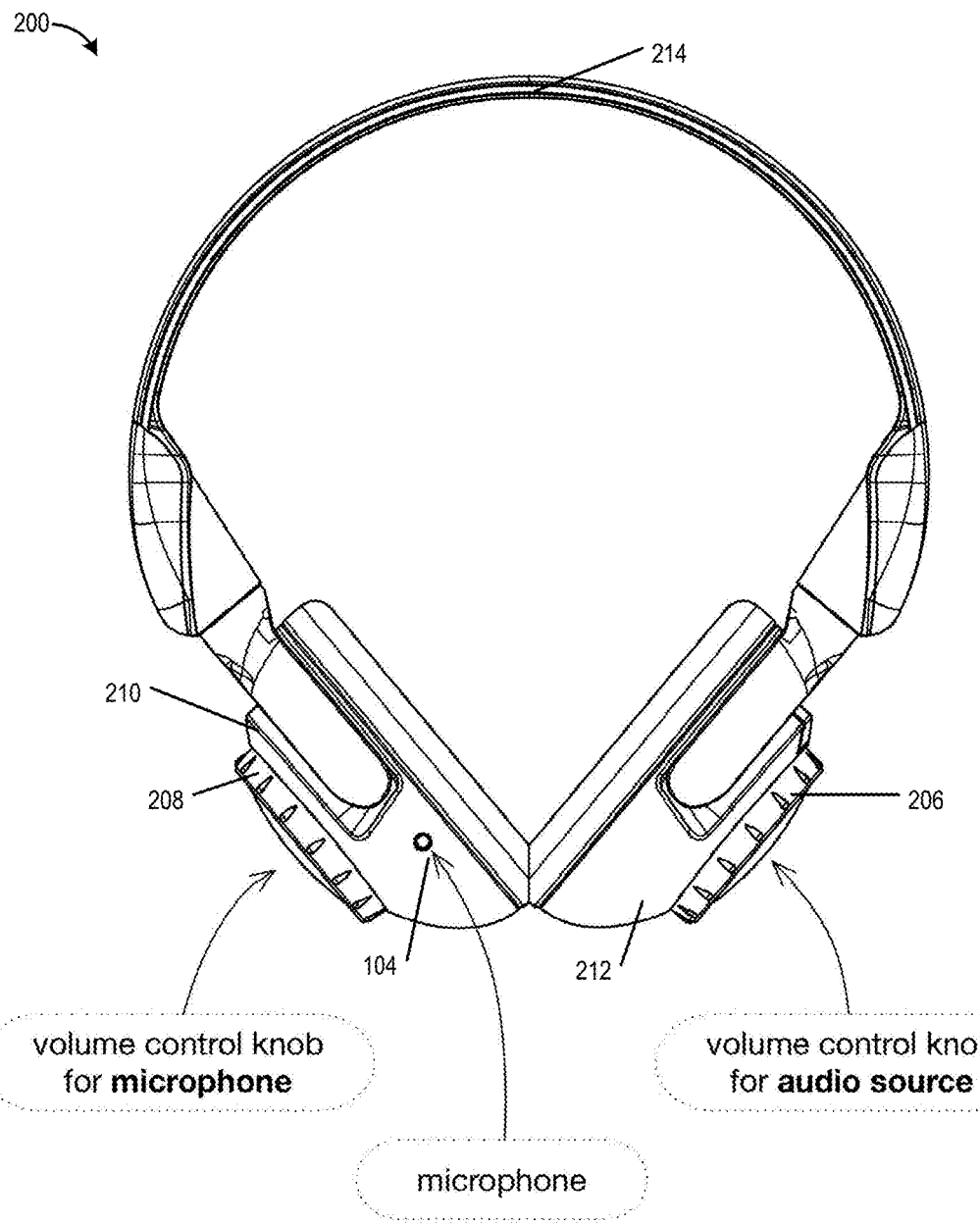
FIG. 2A illustrates a front view of an embodiment of the multiple audio source headphone set incorporating the systems illustrated in the block diagram of FIG. 1.

FIG. 2A illustrates a front view 200 of an embodiment of the multiple audio source headphone set 100 incorporating the systems illustrated in the block diagram of FIG. 1. In the illustrated embodiment, a microphone 104 is included in one of the headphone speaker casings. In some implementations, the headphones may include multiple microphones. For example, a microphone may exist in each speaker casing. In other embodiments, the microphone may be located on the band that connects the two speakers of the headphone set. In yet another embodiment, the microphone may be in a separate device from the headphone set. For example, the microphone may be in a device that can be discreetly located in a particular room. In some such cases, the microphone can wirelessly transmit ambient sound to the headphones.

In the illustrated embodiment of FIG. 2A, a volume control knob 206, 208 is positioned on each headphone speaker. One volume control knob 206 may be used to adjust the audio source supplied to the headphones, which may be supplied over a wire or wirelessly, and one volume control knob 208 may be used to adjust the ambient sound picked up by the microphone, or by a second audio source. In some cases, the volume control circuits 106 and 108, which may be controlled by the control knobs 206 and 208, respectively, may be built into one or both of the ear pieces 210 and 212 of the headphones. The ear pieces 210 and 212 may include the portion of the headphones that house the speakers. headphone portions. In other embodiments, the volume control circuits 106 and 108 may be included as part of a circuit located elsewhere in the headphones, such as in the band 214 between the two headphone speakers or ear pieces 210, 212 that connects the two headphone speakers or ear pieces 210, 212 together.

As an alternative, or in addition to the volume control knobs 206, 208 on the headphone speakers, one or more volume control buttons or mechanisms may be included on a wire of the headphone set that connects to the external audio source. In another implementation, the volume control system may be on a separate device, such as a remote control or via an app on a smartphone.

Figure 2B:
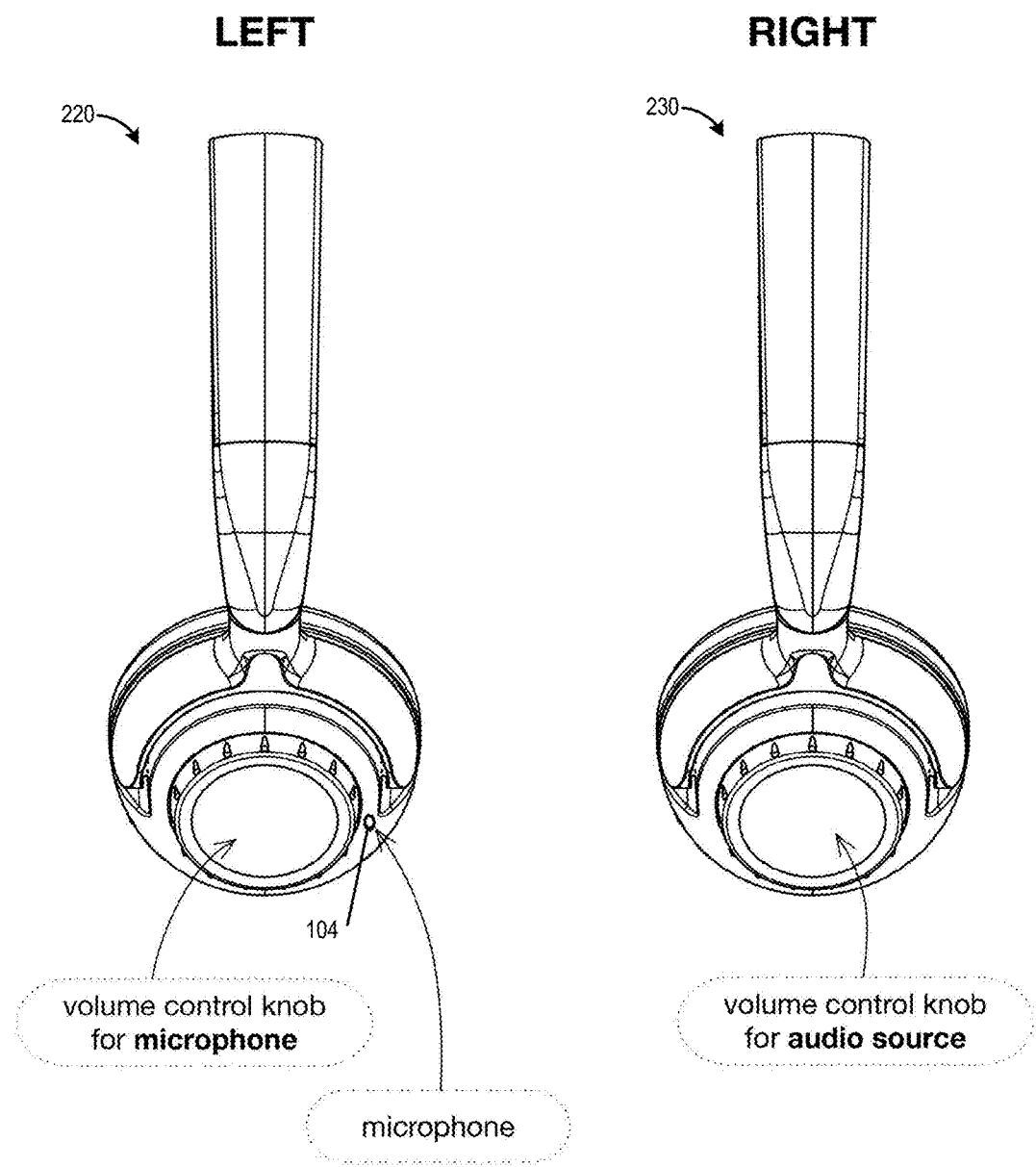
FIG. 2B illustrates a side view of the embodiment of the multiple audio source headphone set of FIG. 2A.

FIG. 2B illustrates a left side view 220 and a right side view 230 of the embodiment of the multiple audio source headphone set of FIG. 1. As illustrated, the microphone 104 may be on the left side of the headphones. However, as previously described, the microphone placement is not limited by the illustrated embodiment. Further, additional controls may be included on the headphones. For example, a control may be included to select from among a number of external audio sources. For instance, one or more terminals or devices may be electrically connected to a number of media sources. The terminals may be configured to wirelessly transmit audio to the headphones. Thus, for example, one terminal may be connected to a television and another terminal may be connected to a radio. A button or other user interface mechanism may be included on the headphone to enable a user to select which audio source is currently active (e.g., the television or the radio) or which audio source to provide to the user via the headphones.

The headphones of FIG. 2A may be worn and used over the ears of a user without requiring any different wearing configuration than un-enhanced headphones, or headphones that do not implement the features of the present disclosure. When the user wants to speak with other users, hear another user speak, hear an announcement, or stay informed with the audio cues of the user's immediate environment, the user can turn on the microphone 104 and adjust the microphone dial 208 to a desired volume level. The user can adjust the volume of the audio received via the receiver 102 and the volume of the ambient sounds detected by the microphone 104 independently. Further, the user can turn one audio source off while leaving the other audio source on.

In one example use case, a user who is walking through an airport listening to music in his or her headphones from a media player may turn on and adjust the microphone sound level to a point or volume that enables the user to clearly hear flight departure information while continuing to listen to music from the media player. In another example use case, a user who is walking down a city street listening to music in his or her headphones may turn on and adjust the microphone sound level to a point of awareness of the user's environment (e.g., so the user can hear traffic or other pedestrians) while continuing to listen to music from a media player. In yet another example use case, a user while flying on an airplane may turn off or reduce the headphone audio volume for the external media source (e.g., inflight movie) and turn up the microphone sound level to a point where the user can hear and communicate with the flight attendant. As another example use case, a user may watch and listen to a television program using the headphones. The audio from the television program may be provided to the headphones over a wire or wirelessly and the volume may be adjusted on the headphones for the television audio to be at a setting that the user can hear the television audio.

Further, the user may set the volume of ambient sounds received by the headphones at a setting that is loud enough for the user to hear the doorbell or a call to dinner. In another example use case, the user may be at a bar, such as a sports-themed bar, watching a football game. The audio from the football game may be transmitted from the television to the user's mobile device and the user may use a set of earbuds or other headphones to listen to the audio via the mobile device. Further, the mobile device may be configured to pick up ambient sounds, which the user may then also hear via the earbuds. Thus, in this example use case, the user may watch and hear the football game while also hearing the bartender or other employees of the bar, or the user's friends who may be watching the game with the user. In each of these use case examples, the user may select the mix between headphone audio volume and microphone ambient sound volume that enables the particular user to hear both the external audio source and the ambient sounds with the clarity desired by the user.

In some embodiments, the headphones may be noise cancelling headphones. In some such embodiments, a user can turn up the volume for the microphone to hear ambient sounds. The user can turn down the volume to block the ambient sounds and obtain the benefit of the noise cancelling headphones. Advantageously, in certain embodiments, a user can have a conversation with another user without removing the noise cancelling headphones. When the conversation is complete, the user can turn down the ambient sound volume to restore the benefit of wearing noise cancelling headphones.

Example Wireless Device

Figure 3:
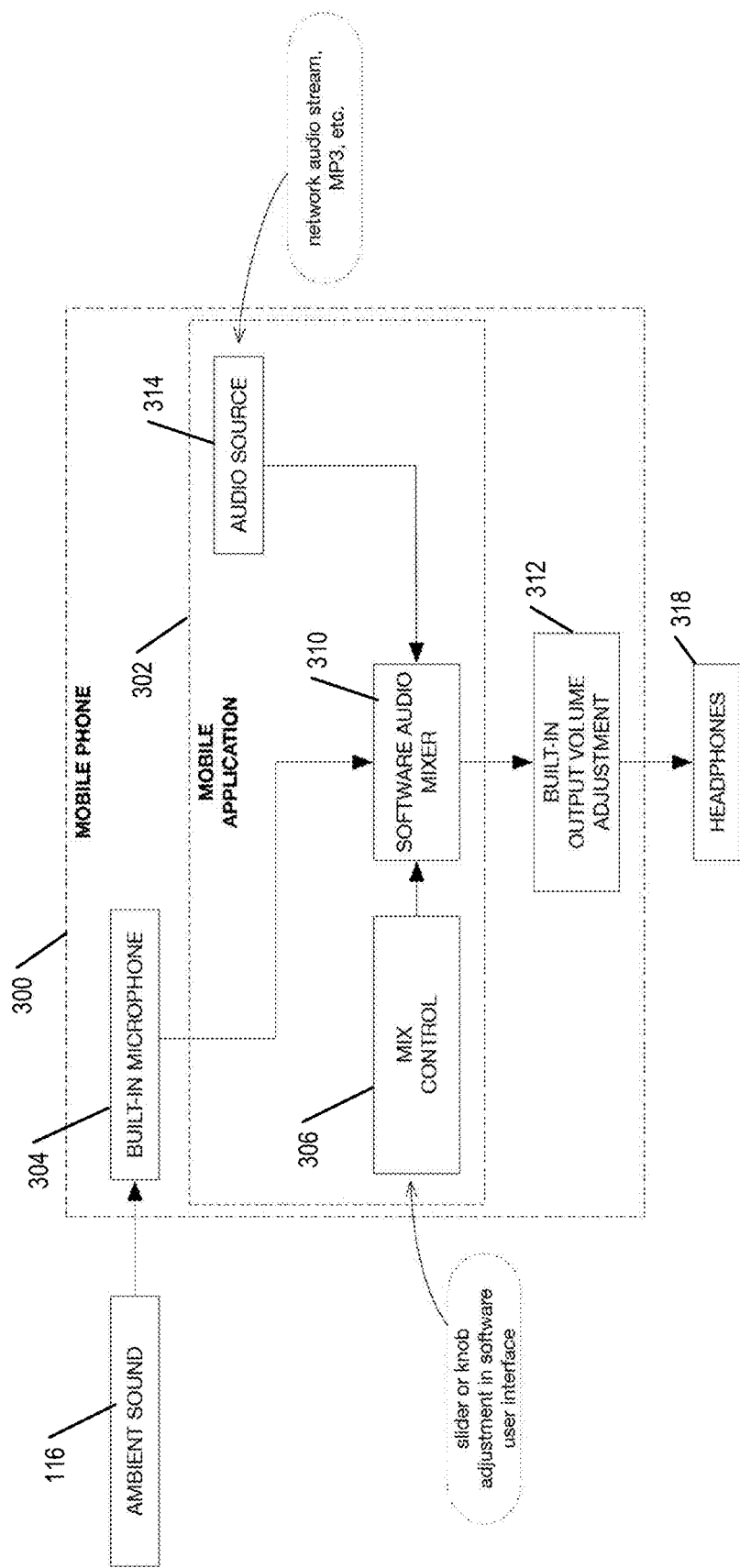
FIG. 3 illustrates a block diagram of an embodiment of a mobile phone.

FIG. 3 illustrates a block diagram of an embodiment of a wireless device, a mobile phone 300, which can communicate with any of the headphones described herein. As illustrated, the mobile phone 300 may use an application 302 to mix audio 116 received from a microphone 304 of the mobile phone 300 with audio 314 from another source, such as an audio stream, an mp3 or other audio file on the device, or a streaming video. This audio 314 may include audio that is stored on the mobile phone 300 or audio received over a network, such as the Internet. In this embodiment, the functionality of mixing the ambient audio with other audio (such as television audio) is in a mobile device, such as a phone, rather than in the headphones themselves. In this way, any commercially available headphones can connect with the mobile device to take advantage of the audio mixing features described herein.

In the illustrated embodiment, a software audio mixer 310, implemented in a physical hardware processor (not shown), is used to mix the two (or more) audio sources. Advantageously, in certain embodiments, the disclosed system can be implemented with a standard mobile phone without any additional hardware. However, in other embodiments, additional hardware (such as a separate processor) may be included in the mobile phone 300 to implement the embodiments disclosed herein. For example, a hardware audio mixer 110 may be added to the mobile phone 300.

As illustrated in FIG. 3, the mobile application 310 may include a mix control or mix controller 306 for adjusting the volume of the audio sources that are mixed by the software audio mixer. In some cases, the audio source volume may be controlled by physical buttons of the mobile phone 300 and the ambient sound volume may be adjusted by a user interface presented to the user on the mobile phone display.

In certain embodiments, the mobile phone 300 includes a volume adjustment interface 312 that can be used to adjust the volume of the output of the ambient sound 116, the output of the audio source 314, or the output of the mix of the ambient sound 116 and the audio source 314. Further, the mobile phone 300 may output the audio via a set of headphones 318. In some embodiments, the headphones 318 may include one or more of the features described with respect to the headphones 100.

Although the wireless device of FIG. 3, has primarily been described as a mobile phone 300, it should be understood that the wireless device is not limited as such. Instead, the wireless device may include any type of device that can combine multiple audio sources for output to a user. For example, the wireless device may be a portable media device, an electronic reader (e-reader) device, a portable video game console, and the like. Further, in some cases, the wireless device may be a non-portable device, such as a television, a video game console, a non-portable media player, and the like. In some cases, the device 300 may be a non-wireless device. For example, the device 300 may receive audio via a wireline connection.

In some embodiments, the device 300 is a general purpose device (e.g., a smartphone) that includes software that provide the functionality of certain embodiments described herein. However, in certain other embodiments, the device 300 is not a general purpose device, but is instead a device that is specifically designed to provide a user with the functionality of one or more of the embodiments described herein. In other words, in some embodiments, the device 300 is an audio mixing device created to enable users, who may have difficulty hearing, to listen to multiple audio sources in parallel or substantially in parallel. In some such embodiments, the device 300 may be configured to receive audio via a wire or cable or to wirelessly receive audio from another device, such as a television or radio. Further, the device 300 may receive ambient sound via its microphone 304. The received audio and the ambient sound may be mixed using the audio mixer 310, or a hardware audio mixer as has previously been described. Advantageously, the device 300 can be used to provide the audio mixing features described herein with a variety of devices that do not themselves include the features described herein.

Figure 4:
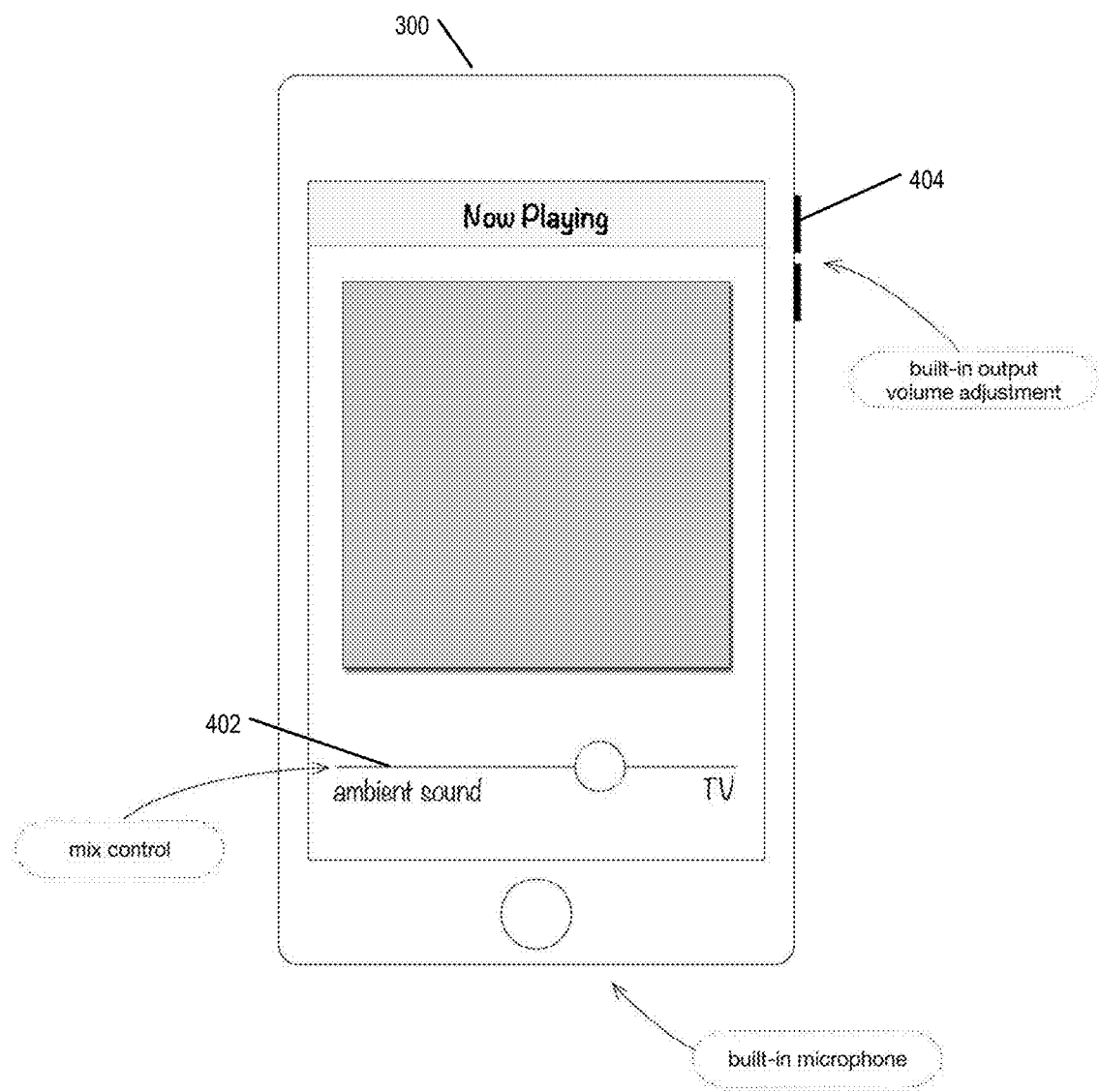
FIG. 4 illustrates an embodiment of a mobile phone incorporating the systems illustrated in the block diagram of FIG. 3.

FIG. 4 illustrates an embodiment of a mobile phone 300 incorporating the systems illustrated in the block diagram of FIG. 3. As illustrated in FIG. 4, in some embodiments, a user can use a user interface control 402, such as a slider, to adjust the ratio of the ambient sound to the television sound, or other media played by the smartphone. This user interface control 402 may be accessed via a touchscreen interface. In some cases, the mobile device may be used as a remote control for the headphones of FIG. 2A. Thus, the slider may be used to adjust the ratio of the ambient sound to the sound of the external audio provided to the headphones. Further, the device may include physical volume adjustment buttons 404.

Additional Headphone Embodiments

Figure 5:
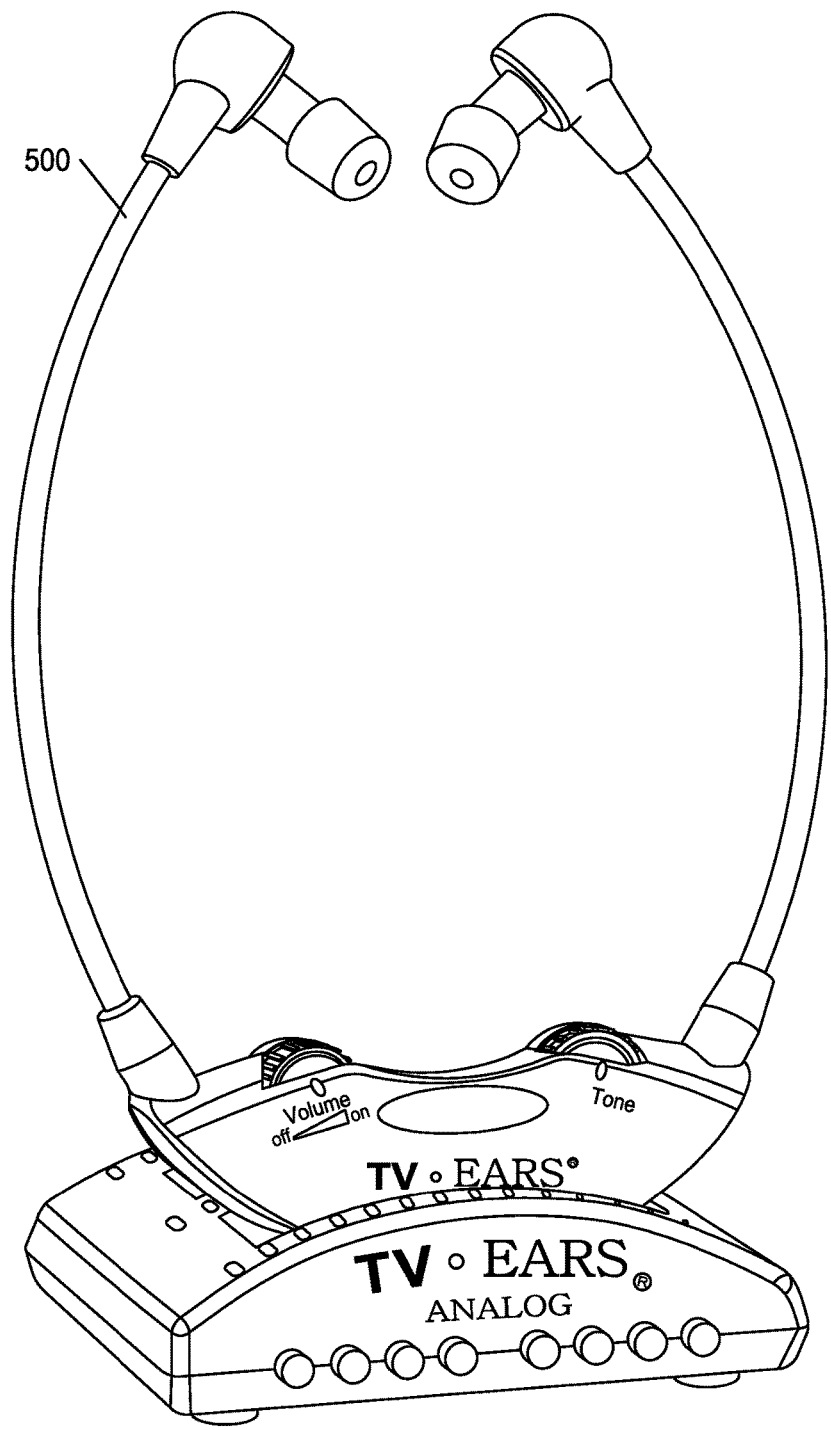
FIG. 5 illustrates an embodiment of a pair of earbud-type headphones incorporating the systems illustrated in the block diagram of FIG. 1.

FIG. 5 illustrates an embodiment of a pair of earbud-type headphones 500 that can optionally incorporate the system illustrated in the block diagram of FIG. 1. The earbud-type headphones 500 can implement one or more of the embodiments described with respect to the headphones of FIG. 1, and FIGS. 2A and 2B.

Figure 6A:
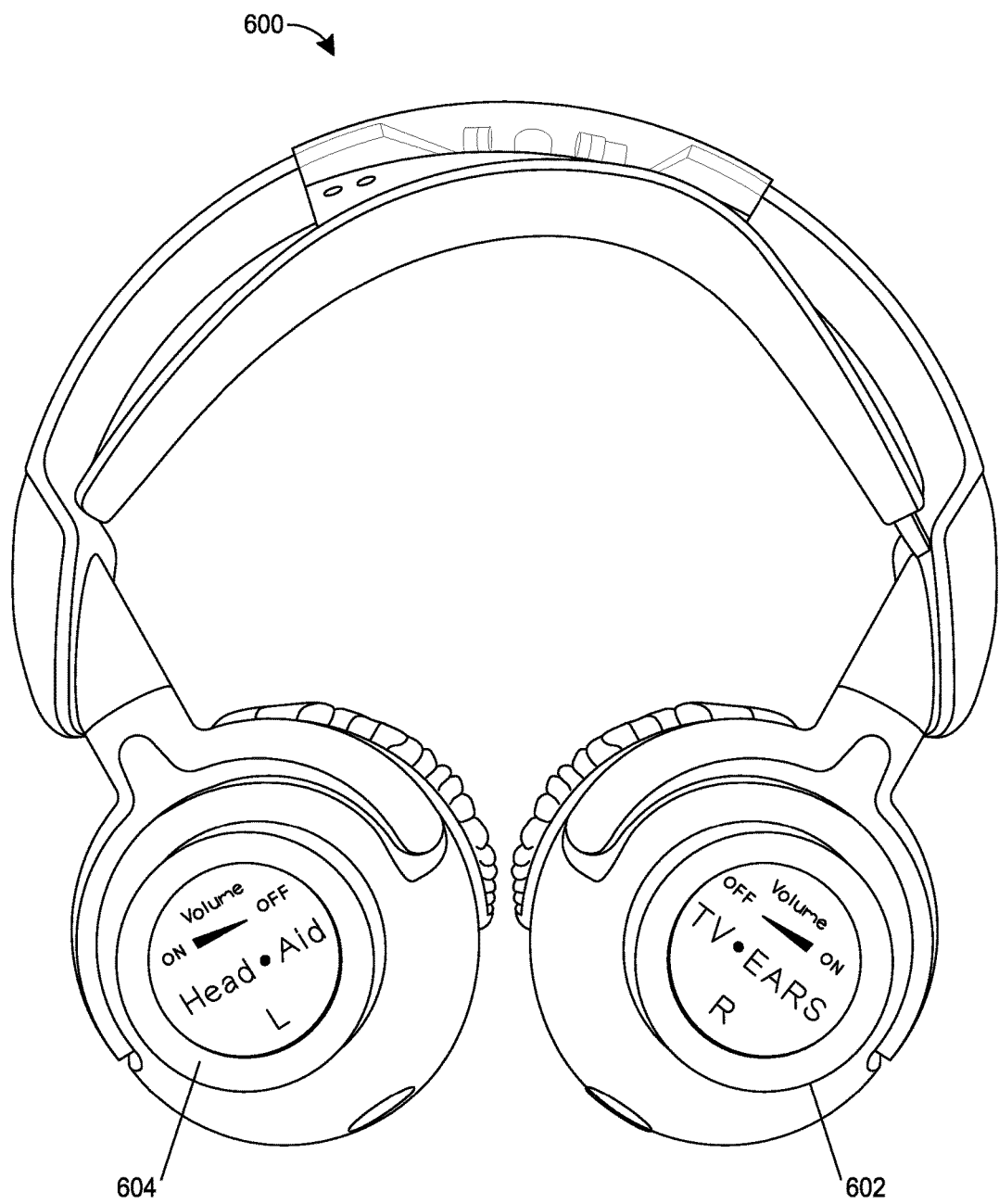
FIGS. 6A and 6B illustrate an embodiment of a headphone prototype that includes audio mixing capabilities.
Figure 6B:
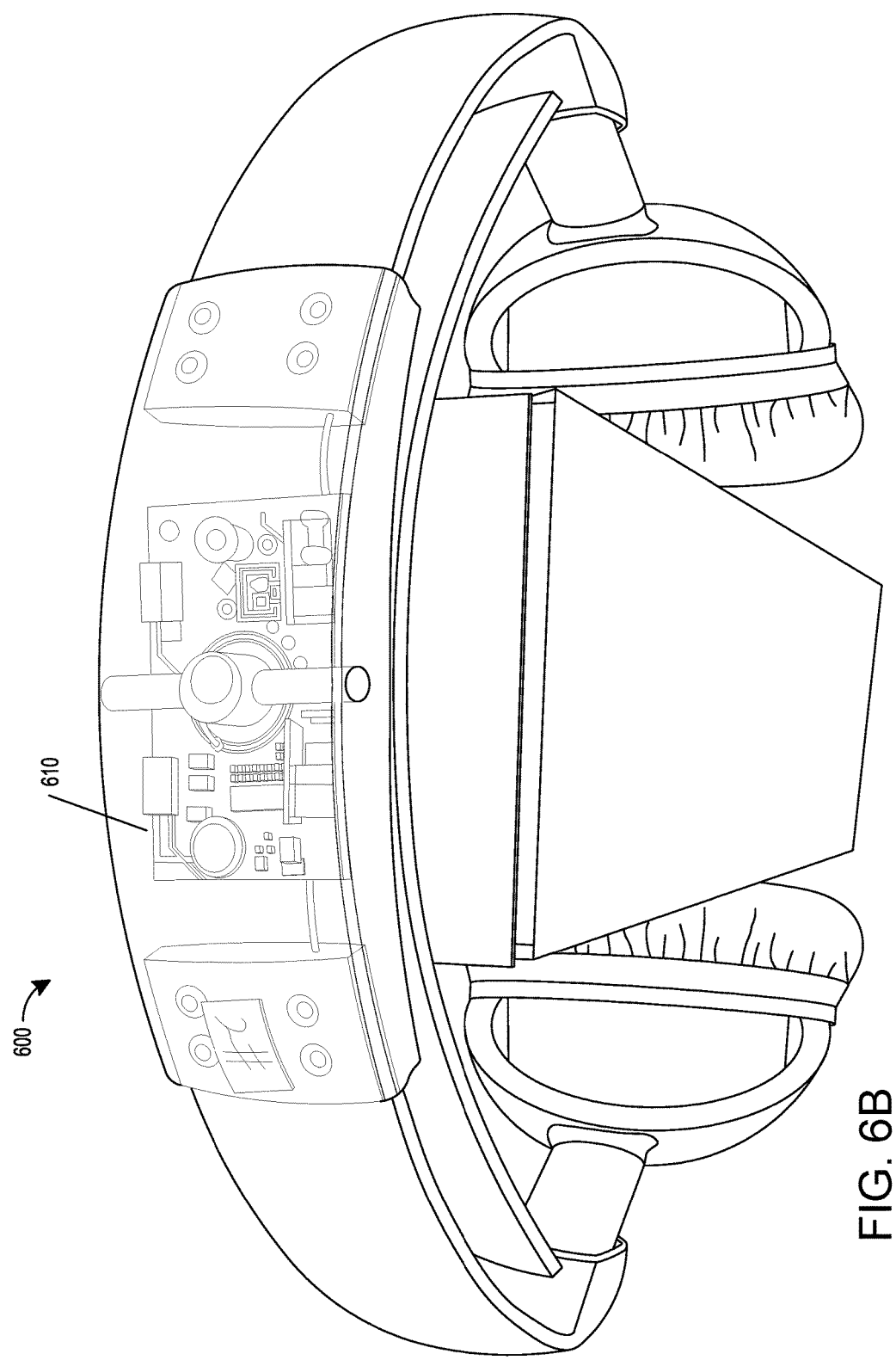

FIG. 6A illustrates a prototype of headphones 600 that implement features described herein with respect to the headphones 100 and/or 200. As illustrated, the headphones 600 include separate volume controls for the audio source, volume control 602, and the ambient sounds, volume control 604. FIG. 6B illustrates an alternative view of the headphones 600. As illustrated in FIG. 6B, a circuit 610 may be inserted into the headphones 600. The circuit 610 may include a number of elements that implement the previously described functionality. For example, the circuit 610 may be a printed circuit board (PCB) and/or an integrated circuit that includes, among other things, a microphone, an amplifier, a volume control circuit, and/or an audio mixing circuit. In some cases, the features described herein are implemented by the circuit 610. However, in other cases, some of the features may be implemented by additional circuits located throughout the headphones 600. For example, a portion of the circuitry may be located in the ear pieces that house the speakers. For instance, the microphone, and corresponding circuitry, may be located in one or both of the ear pieces. The additional circuitry may communicate with the circuit 610 via a wire, wireless, or optical connection In other implementations, all of the circuitry may be located within one or both of the ear pieces.

Figure 7:
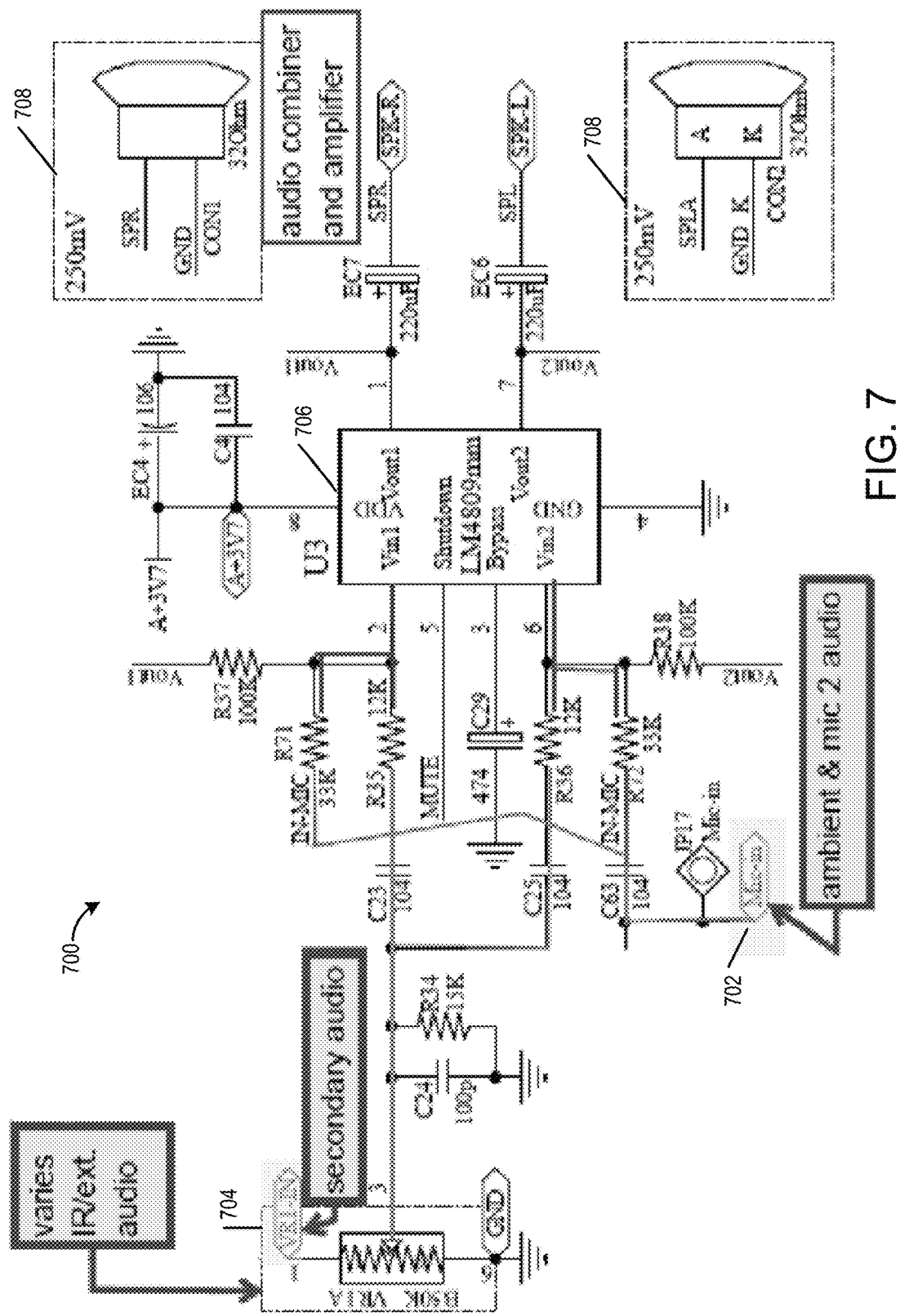
FIG. 7 illustrates an embodiment of a circuit for mixing multiple audio sources in accordance with features disclosed herein.

FIG. 7 illustrates an embodiment of a circuit 700 for mixing multiple audio sources in accordance with features disclosed herein. The circuit 700 may be implemented as part of the circuit 610 of FIG. 6B (or any of the other circuits described herein). These circuits may receive multiple audio sources, such as one from an audio receiver and one from a microphone, and mix the audio received from the multiple audio sources for output to the user. Although the audio is mixed, the audio fidelity or the accuracy of the audio is maintained such that a user can distinguish the audio to at least the same degree as the individual audio from the individual audio sources can be distinguished when listened to separately.

As illustrated in FIG. 7, the circuit 700 may include a microphone input 702 for obtaining sound from an ambient source. Alternatively, the input 702 may be used to obtain an input from some other sound source, such as a media player. Further, the circuit 700 may receive audio from an additional source, such as another media player, at an audio input 704. This input 704 may be an infrared input, an external audio jack, or any other audio input. In some cases, the input 704 may be via Bluetooth® or any other type of wireless communication technology.

The audio from the two (or more) sources may be provided to the amplifier 706 to be amplified before being output to the speakers 708. In the illustrated example, the audio received via the inputs 702 and 704 from the multiple audio sources are combined using resistors. The multiple communication channels are combined into one that is then fed into the amplifier 706. For example, the audio from input 702 and the audio from the input 704 may be combined via the resistors R36 and R72 into one channel that is fed into the amplifier 706 along input 6 to the amplifier 706. Similarly, the audio from input 702 and the audio from the input 704 may be combined via the resistors R35 and R71 into one channel that is fed into the amplifier 706 along input 2 to the amplifier 706. It should be understood that other mechanisms may be used to combine audio from multiple sources. For example, the circuit 700 may use operational amplifiers and/or a summing amplifier to combine the audio from multiple audio sources.

Example Use Cases

In addition to the previously described use cases, the embodiments disclosed herein enable any number of additional use cases that enable a user to hear multiple audio sources, which can include ambient sound as an audio source. In many cases, the ability to hear multiple audio sources enables multitasking. Further, a user can listen to multiple audio sources without needing to deactivate an audio source.

For example, suppose a user is walking his or her dog while listening to music via headphones. Using embodiments disclosed herein, the user can still hear ambient sound enabling the user to hear safety-related audio cues. For instance, a user could hear a car horn, a walk signal, a child on a skateboard, another dog that may react to the user's dog, or another pedestrian while continuing to listen to music. Being able to hear these ambient sounds enables the user to react to potential dangers while continuing to enjoy music, or other media, while walking. Further, if another person stops the user to, for example, ask about the dog, the user can interact with the user without having to turn off the media player or remove the headphones. Thus, the user can continue to listen to music while interacting with the person who spoke to the user. The ability to interact with other users without removing the headphones can be particularly convenient for a user whose hands are full (e.g., by the dog's leash and a water bottle).

In another use case, a user who is exercising at a gym can continue listening to music while interacting with other gym members. For example, a user on a treadmill can talk to the user's spouse on the neighboring treadmill while continuing to listen to music or a television. Further, neither the user, nor the spouse, need remove their hands from the treadmill handles to adjust the headphones because the headphones can mix the ambient sound and the media to which the user is listening.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A headphone set comprising:
    a left speaker housing comprising a left speaker;
    a right speaker housing comprising a right speaker;
    a connecting band connecting the left speaker housing with the right speaker housing; and
    electronic audio mixing circuitry at least partially disposed in one or more of the left speaker housing, the right speaker housing, or the connecting band, the electronic audio mixing circuitry comprising:
        a wireless receiver configured to receive a first audio signal corresponding to first audio from an audio device over a wireless connection;
        a microphone configured to receive ambient audio from a user environment external to the headphone set and to convert the ambient audio into a second audio signal;
        an echo cancellation circuit configured to attenuate an echo caused by the microphone receiving the first audio from speakers outputting the first audio;
        a first volume control movable by a user to adjust a first volume level associated with the first audio signal to produce an adjusted first audio signal;
        a second volume control movable by the user to adjust a second volume level associated with the second audio signal to produce an adjusted second audio signal; and
        an audio mixer configured to mix the adjusted first audio signal with the adjusted second audio signal to obtain an audio output and to supply the audio output to one or both of the left speaker and the right speaker.

2. The headphone set of claim 1, wherein the audio mixer comprises a hardware audio mixer.

3. The headphone set of claim 1, wherein one or more of the left speaker or the right speaker are configured to output the audio output.

4. The headphone set of claim 1, wherein one of the left speaker or the right speaker is configured to output a first component of the audio output corresponding to the first audio signal and the other of the left speaker or the right speaker is configured to output a second component of the audio corresponding to the second audio signal.

5. The headphone set of claim 1, wherein the wireless receiver is further configured to:
    receive a volume control signal for adjusting an audio volume; and
    provide the volume control signal to the first volume control, the second volume control, or both the first volume control and the second volume control.

6. The headphone set of claim 1, wherein the electronic audio mixing circuitry further comprises an amplifier configured to amplify one or more of the first audio signal or the second audio signal.

7. The headphone set of claim 1, wherein the first audio signal and the second audio signal are mixed using superposition.

8. A speaker apparatus comprising:
    a wireless receiver configured to receive a first audio signal from an audio device;
    a microphone configured to receive audio from a user environment and to convert the audio into a second audio signal;
    an echo cancellation circuit configured to attenuate an echo caused by the microphone receiving device audio from a device speaker of the audio device, the device audio corresponding to the first audio signal;
    a first volume control configured to adjust a first volume level associated with the first audio signal;
    a second volume control configured to adjust a second volume level control associated with the second audio signal;
    an audio mixer configured to mix the first audio signal with the second audio signal based at least in part on the first volume level and the second volume level to obtain an audio output; and
    headphone speakers configured to output the audio output.

9. The speaker apparatus of claim 8, wherein the audio mixer comprises a hardware audio mixer.

10. The speaker apparatus of claim 8, wherein the headphone speakers further comprise a first speaker configured to output a first component of the audio output and a second speaker configured to output a second component of the audio output.

11. The speaker apparatus of claim 8, wherein the wireless receiver is further configured to receive an input to the first volume control from an external volume control source, wherein the first volume control adjusts the first volume level based at least in part on the input to the first volume control.

12. The speaker apparatus of claim 8, wherein the wireless receiver is further configured to receive an input to the second volume control from an external volume control source, wherein the second volume control adjusts the second volume level based at least in part on the input to the first volume control.

13. The speaker apparatus of claim 8, wherein the speaker apparatus further comprises an amplifier configured to amplify one or more of the first audio signal or the second audio signal.

14. The speaker apparatus of claim 8, wherein the first audio signal and the second audio signal are mixed using superposition.

15. A method of combining audio from a plurality of audio sources, the method comprising:
    by a hardware audio mixer comprising one or more hardware processors:
        receiving a first audio signal from a media device configured to output audio;
        receiving, at a microphone, ambient audio from an environment that includes the media device;
        converting the ambient audio to a second audio signal;
        receiving an echo at the microphone corresponding to audio received at the microphone, the audio corresponding to the first audio signal;
        performing an echo cancellation process to reduce the amount of echo included in the ambient audio;
        receiving a first volume level associated with the first audio signal;
        receiving a second volume level associated with the ambient audio; and
        mixing the first audio signal and the second audio signal based at least in part on the first volume level and the second volume level to obtain an audio output signal.

16. The method of claim 15, further comprising mixing the first audio signal and the second audio signal using superposition.

17. The method of claim 15, further comprising outputting the audio output signal via one or more speakers included in a set of headphones.

18. The method of claim 15, wherein the media device includes the hardware audio mixer.

* * * * *